US007104653B2

United States Patent
Moriwaki et al.

(10) Patent No.: US 7,104,653 B2
(45) Date of Patent: Sep. 12, 2006

(54) SYSTEM FOR CORRECTING APPROXIMATE EXPRESSIONS USED IN GEOMETRICAL CORRECTION OF PROJECTED IMAGES

(75) Inventors: Daisuke Moriwaki, Tokyo (JP); Yoshiharu Komatsu, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 40 days.

(21) Appl. No.: 10/824,654

(22) Filed: Apr. 15, 2004

(65) Prior Publication Data
US 2004/0257366 A1  Dec. 23, 2004

(30) Foreign Application Priority Data
Apr. 18, 2003  (JP)  ............... 2003-114958

(51) Int. Cl.
*G03B 21/14* (2006.01)
*H04N 3/23* (2006.01)
(52) U.S. Cl. ............... 353/69; 353/70; 348/746
(58) Field of Classification Search ............... 353/69, 353/70, 28, 121; 348/745–747; H04N 3/23
See application file for complete search history.

(56) References Cited

U.S. PATENT DOCUMENTS 6,431,711 B1 *  8/2002  Pinhanez ............... 353/69
6,834,965 B1 *  12/2004  Raskar et al. ............... 353/94
2003/0098957 A1 *  5/2003  Haldiman ............... 353/69
2004/0184013 A1 *  9/2004  Raskar et al. ............... 353/121

FOREIGN PATENT DOCUMENTS

| JP | 2001-169211 | 6/2001 |
| JP | 2002-14611 | 1/2002 |
| JP | 2003-85586 | 3/2003 |

OTHER PUBLICATIONS

Least Squares Fitting, mathworld.wolfram.com: http://mathworld.wolfram.com/LeastSquaresFitting.html, printed on Mar. 17, 2006.*

* cited by examiner

*Primary Examiner*—W. B. Perkey
*Assistant Examiner*—Andrew Sever
(74) *Attorney, Agent, or Firm*—McGinn IP Law Group, PLLC

(57) ABSTRACT

A computer calculates the shape of a figure after transformation using an approximate expression previously set for correcting a projected image for distortion associated with the shape of a projection surface of a cylindrical screen (an equation representative of a parabola in this case), a variable for horizontal transformation and a variable for vertical transformation which are entered through a user interface for transforming the approximate expression, and/or a variety of parameters required for transformation of image and optical corrections such as the optical center, linearity, amplitude, and position. A projector scales up or down pixels to produce a transformed image from the calculated figure after transformation for projection onto the cylindrical screen.

6 Claims, 8 Drawing Sheets

BEFOR TRANSFORMATION

AFTER TRANSFORMATION

A CYLINDRICAL SCREEN

A SCREEN EXTENDING OVER TWO WALLS INCLUDING A CORNER BETWEEN BOTH WALLS

A SPHERICAL SCREEN

A CONCAVE SCREEN

ARROWS DRAWN IN THE FIGURES INDICATE DIRECTION IN WHICH THE PROJECTOR PROJECTS AN IMAGE

Fig. 8

A SINUSOIDAL WAVE SCREEN

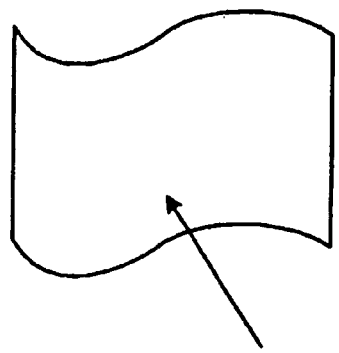

A SCREEN INCLUDING WALLS OF A RECTANGULAR SOLID INCLUDING CORNERS BETWEEN BOTH WALLS

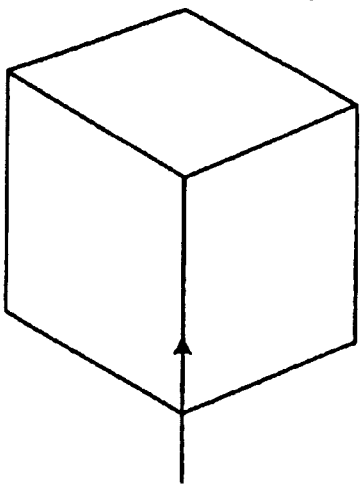

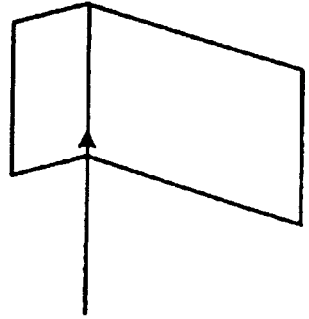

A SCREEN EXTENDING OVER TWO WALLS INCLUDING A CORNER BETWEEN BOTH WALLS WITH THE LEFT WALL AND RIGHT WALL BEING IN A DIFFERENT PROPORTION

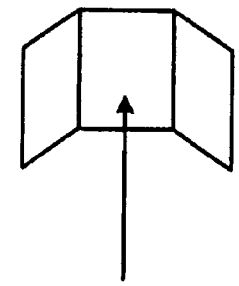

A WALL – SHAPED SCREEN HAVING CORNERS ON THE LEFT AND RIGHT SIDES

ARROWS DRAWN IN THE FIGURES INDICATE DIRECTION IN WHICH THE PROJECTOR PROJECTS AN IMAGE

SYSTEM FOR CORRECTING APPROXIMATE EXPRESSIONS USED IN GEOMETRICAL CORRECTION OF PROJECTED IMAGES

BACKGROUND OF THE INVENTION

1. Field of the Invention

The present invention relates to techniques for correcting the distortion of a projected image which may occur when there is a difference between an original image as captured or created and the shape of the projected image generated when the original is projected.

2. Description of the Related Art

Due to the difference between a projecting method used to capture or create an original image and a projecting method used to project the original image onto a planetarium, or when the image is projected onto a spherical screen, the projected image may suffer from distortion. To reduce or eliminate this distortion of the projected image, JP-2002-14611-A discloses a technique for correcting a original image created for each pixel position before projection.

The technique disclosed in JP-2002-14611-A comprises post-conversion pixel position data generating means and projected image data generating means for sequentially delivering projected image data sequentially supplied from image data supply unit from an output unit to an associated video projector for projection onto a spherical screen. The post-conversion pixel position data generating means converts each pixel position on an original image to a position at which a projected image is less distorted or free from distortion to sequentially generate post-conversion pixel position data, based on a certain consistent correlation between the original image which is the basis of incoming projected image data and distortion of the projected image which is produced when the original image is projected onto the spherical screen. The projected image data generating means sequentially generates projected image data for each frame after the pixel position conversion from applied projected image data and the post-conversion pixel position data generated by the post-conversion pixel position data generating means, and emits the resulting image from an output device for projection, thereby mitigating the distortion of the image projected onto the spherical screen.

In the technique disclosed in JP-2002-14611-A this technique entails the means for converting each pixel position on an original image to a position at which a projected image is less distorted or free from distortion to sequentially generate post-conversion pixel position data, based on a certain consistent correlation between the original image which is the basis of incoming projected image data and distortion of a projected image produced when the original image is projected onto the spherical screen, and a memory having a capacity large enough to store each and every transformed point generated by the means as individual data, as well as a special projector.

In addition, since the technique is developed for a planetarium system and therefore dedicated to a spherical screen, no applicability is taken into consideration for other screens having projection surfaces in arbitrary shapes.

SUMMARY OF THE INVENTION

It is an object of the present invention to provide a system for correcting a projected image for distortion, which is capable of supporting screens in a variety of shapes with a relatively small memory capacity and a simple user interface.

A system for correcting approximate expressions used in geometrical correction of projected images, includes a projector which operates under the control of a program, and a screen on which an image emitted from the projector is projected, wherein the projector includes means for performing a geometrical transformation on a projected image emitted from the projector in accordance with the shape of a projection surface of the screen using an approximate expression previously set for correcting the projected image for distortion associated with the shape of the projection surface of the screen, and a value entered for substitution into a variable for transforming the approximate expression.

The projector includes input means for entering a value for substitution into a variable for transforming the approximate expression, calculating means for calculating a numerical value for transformation using the entered value and the approximate expression previously held in the projector, image processing means for transforming the projected image emitted from the projector based on the result of the calculation made by the calculating means, and optical output means for projecting the image transformed by the image processing means.

In the present invention, the geometrical correction of projected images involves previously holding an approximate expression corresponding to the shape of a curved surface for use in calculation in the event of transformation, and transforming a complicated shape using the approximate expression in a convenient way to correct a projected image for distortion. Thus, the present invention eliminates the need for holding each and every transformation points as individual data, as before, and can reduce large memory capacity requirement.

Also, projected images can be corrected for a variety of screens by providing a variety of approximate expressions in accordance with the shapes of projection surfaces of the respective screens, and transforming the approximate expressions with values entered for substitution into variables. For example, an equation representative of a parabola may be used as an approximate expression for the horizontal direction of the screen to make calculations through transformation of a certain basic shape, and pixels in the vertical direction may be transformed based on the result of the calculations, thereby enabling the geometrical transformation for any of screens with cylindrically curved shapes having a variety of radii of curvature only by changing the values substituted into the variables without holding data on each transformation point.

Alternatively, individual equations representative of parabolas may be used as approximate expressions for the horizontal and vertical direction of the screen, respectively, to make calculations through transformation of certain basic shapes, and pixels in the vertical and horizontal directions may be transformed based on the result of the calculations, thereby enabling the geometrical transformation for screens with spherical shapes having a variety of radii of curvature only by changing the values substituted into the variables without holding data on each transformation point. Also, a linear equation for correcting a corner between flat walls may be used to make calculations through transformation of a certain basic shape, thereby enabling the geometrical transformation for screens extending over two walls including a corner between both walls.

In addition, the system of the present invention need not employ a special projector, and can be readily incorporated in a consumer-use projector for operation therewith. Also, the system need not employ a complicated interface but can employ, for example, a GUI (graphic user interface) type input means such as a slide bar for entering values for substitution into variables to readily make corrections.

BRIEF DESCRIPTION OF THE DRAWINGS

FIG. 8 illustrates other exemplary screens to which the present invention can be applied.

DETAILED DESCRIPTION OF THE PREFERRED EMBODIMENTS

Figure 1:
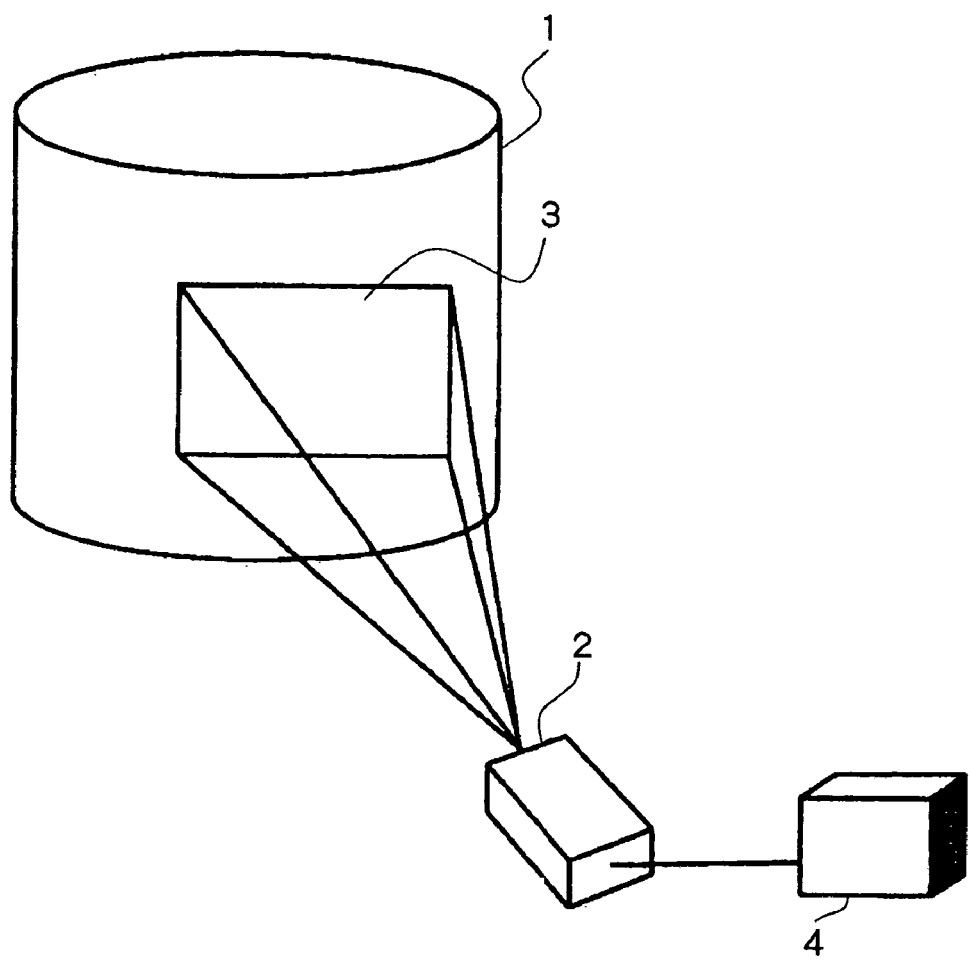
FIG. 1 is a schematic diagram generally illustrating one embodiment of the present invention.
Figure 2:
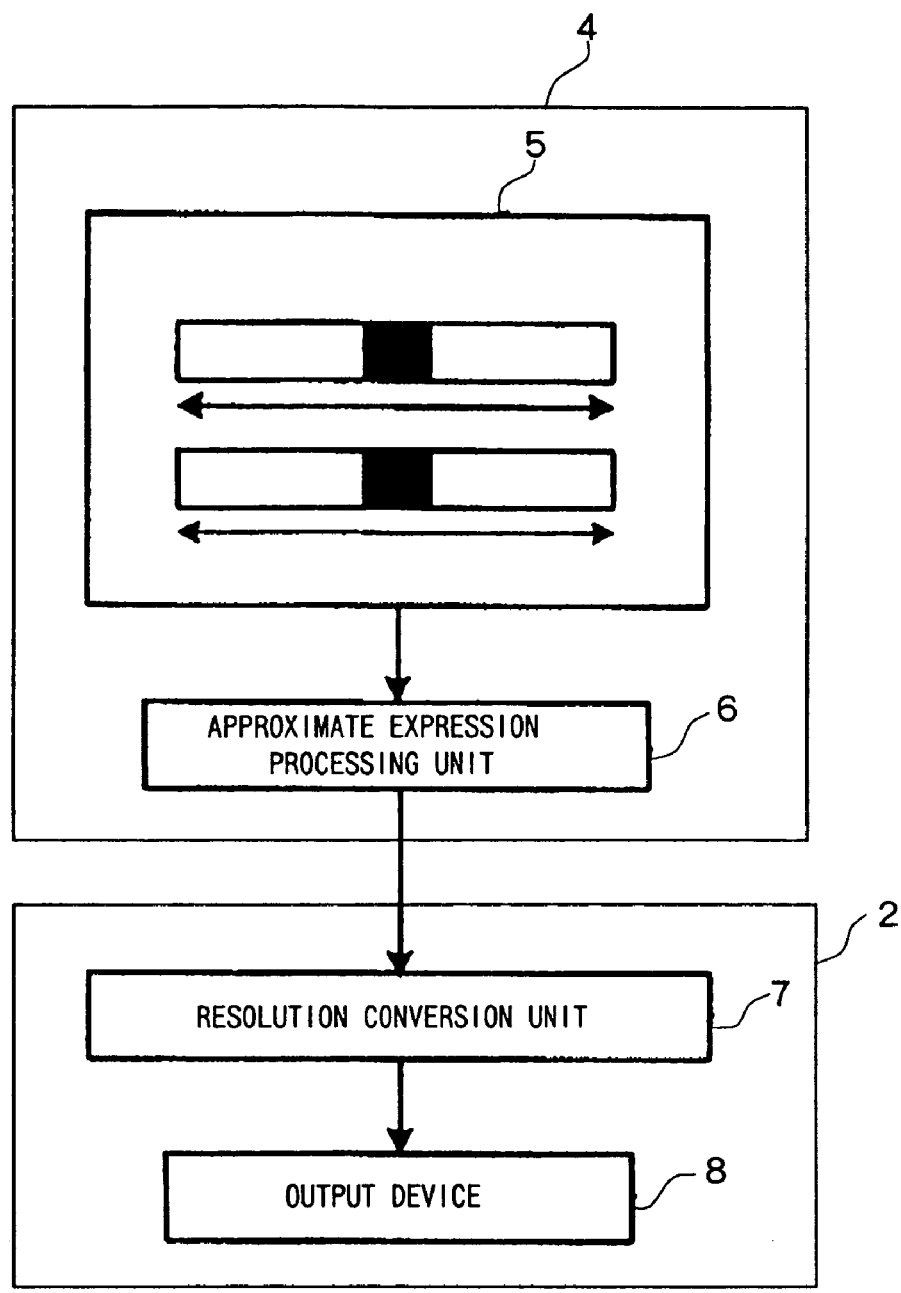
FIG. 2 is a block diagram illustrating one embodiment of a projector according to the present invention.

FIG. 1 is a schematic diagram generally illustrating one embodiment of a system for correcting approximate expressions used in geometrical correction according to the present invention, and FIG. 2 is a block diagram illustrating one embodiment of a projector according to the present invention.

The system for correcting approximate expressions used in geometrical correction of projected images according to the present invention comprises projector 2 which operates under the control of a program and screen 1. Projector 2 includes essential devices required to constitute a projector, such as a central processing unit, a data processing unit, a memory, a lamp, a lens, and the like. Screen 1 is shown as a cylindrical screen in FIG. 1, but may be in any shape as long as it can be approximately transformed using equations.

Alternatively, computer 4 may be separately provided with a projector for processing operations, such that computer 4 executes numerical operations using approximate expressions, the result of which is applied to projector 2 which processes images to transform the images for projection.

Figure 3:
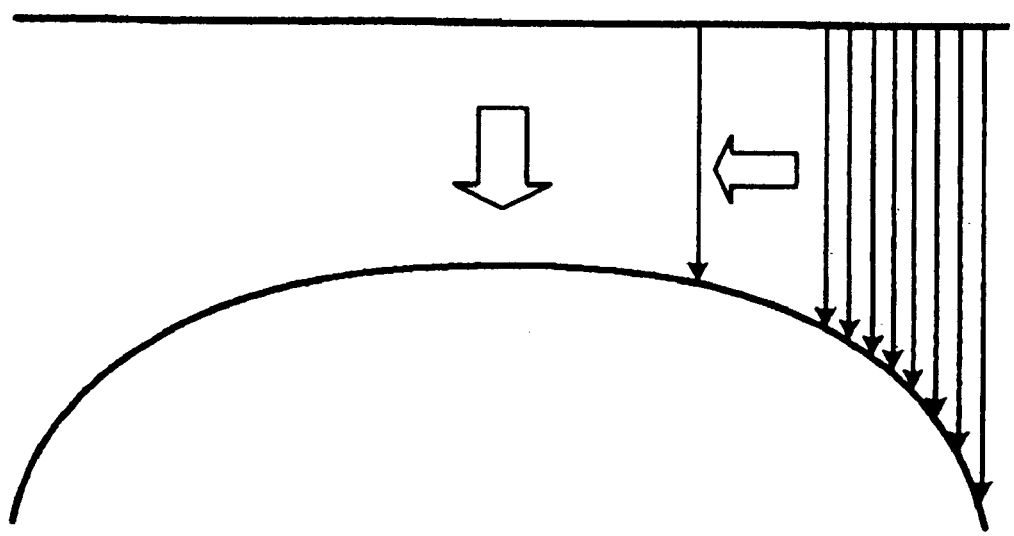
FIG. 3 is a diagram conceptually showing how a geometrical transformation is performed using an approximate expression.

Projector 2 or computer 4 comprise simple input means 5, for example, a slide bar or the like for entering values for substitution into variables; approximate expression processing unit 6 for calculating numerical values for transformation using the values entered from input means 5 for substitution into the variables and approximate expressions corresponding to cylindrical screens held therein; resolution conversion unit 7 for image processing which can apply a transformation to a projected image emitted from projector 2, as illustrated in FIG. 3; and output device 8 for projecting the result of the transformation. In FIG. 3, a straight line before transformation, shown above, is sequentially transformed in a direction indicated by a horizontal arrow, resulting in a corrected curve, shown below, corresponding to a spherical surface after the transformation.

As the user sets numerical values required for processing as values substituted into variables by sliding the slide bar to the left or right on input means 5, approximate expression processing unit 6 substitutes the numerical values set by input means 5 into the variables included in approximate expressions held therein to calculate the shape resulting from a correction. Resolution conversion unit 7 receives the shape resulting from the correction from approximate expression processing unit 6, and scales up or down, for example, a rectangular image for transformation in accordance with the approximate expressions. Output device 8, for projecting the result of the transformation, projects the result of the transformation made by resolution conversion unit 7 onto cylindrical screen 1.

Figure 4:
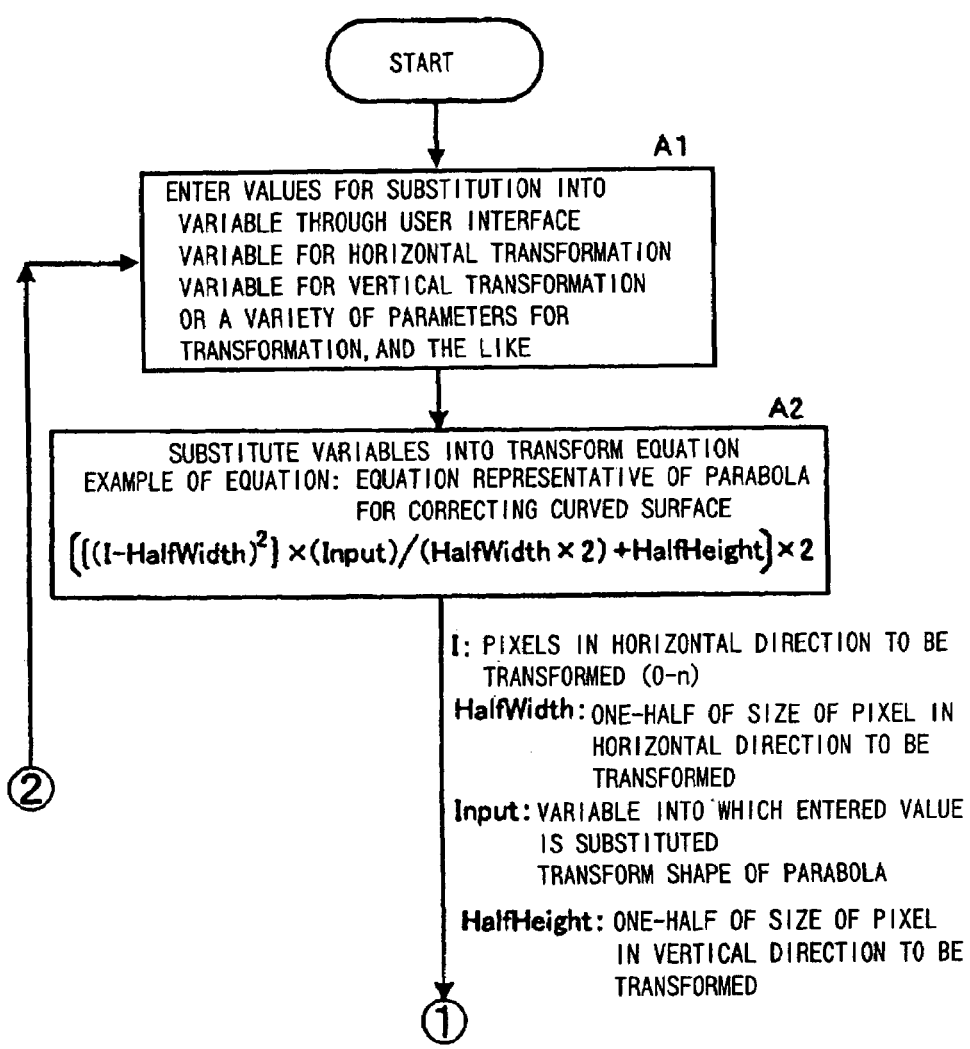
FIGS. 4 and 5 are flow charts illustrating in combination a sequence of operations for transforming an image in the embodiment.
Figure 5:
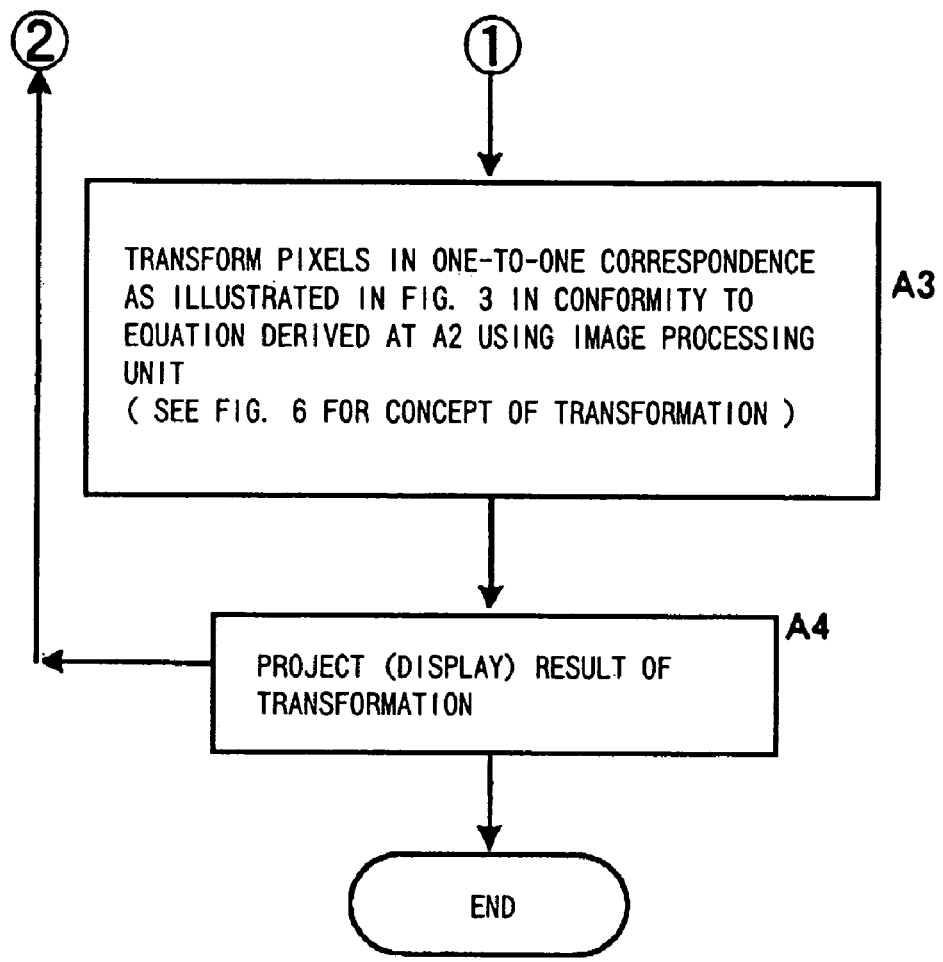
Figure 6:
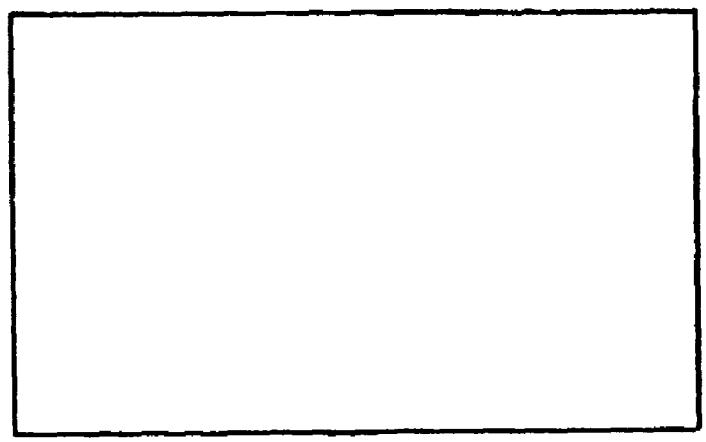
FIG. 6 is a diagram illustrating the result of the geometrical transformation performed in accordance with the embodiment.
Figure 6:
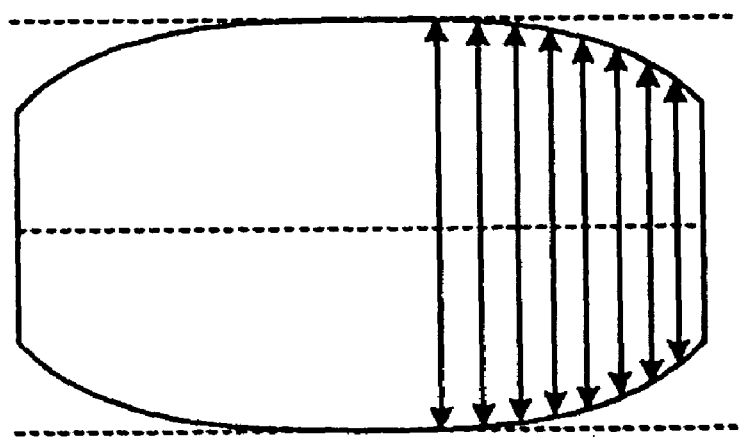

FIGS. 4 and 5 are flow charts illustrating in combination a sequence of operations for transforming an image in this embodiment when cylindrical screen 1 is used for projecting the transformed image thereonto. FIG. 6 is a diagram illustrating the result of the transformation. In the following section, the operations involved in the transformation according to this embodiment will be described in detail with reference to FIGS. 1 to 6.

First, a variable for horizontal transformation, a variable for vertical transformation, and a variety of parameters required for image transformation and optical correction such as the optical center, linearity, amplitude, position, and the like are entered through a simple user interface such as the slide bar of input means 5 (step A1). Next, approximate equation processing unit 6 substitutes the entered variables for transformation into an equation representative of a parabola provided as an approximate equation to calculate the shape of a transformed figure as illustrated in FIG. 6 (step A2).

Next, resolution conversion unit 7 calculates the width of the image at a certain point from the transformed figure calculated by approximate equation processing unit 6, as illustrated in FIG. 6, to find the dimension of the vertical (horizontal) width which matches that of the transformed image, and scales down pixels in conformity to the found vertical (horizontal) dimension. In FIG. 6, vertical pixels are scaled down axisymmetric to the vertical center position for transformation (step A3).

The transformed pixels thus produced are applied to output device 8 which projects the pixels onto cylindrical screen 1 for display (step A4). The projected image is confirmed as displayed on screen 1, followed by termination of the correcting operation if the correction has been properly made. Conversely, if the image has not been sufficiently corrected so that distortion still remains in the projected image, the flow returns to step A1 where different values are entered for substitution into the variables through the slide bar for a repeated adjustment.

While the foregoing embodiment has been described on the assumption that projector 2 is installed to project an image from the front side of screen 1, conditions for installation can be modified as appropriate depending on a particular projector used with the present invention, for example, a rear type projector for projecting an image from the back of a screen, a ceiling suspended type projector suspended from a ceiling, a ceiling suspended rear type projector, and the like.

Figure 7:
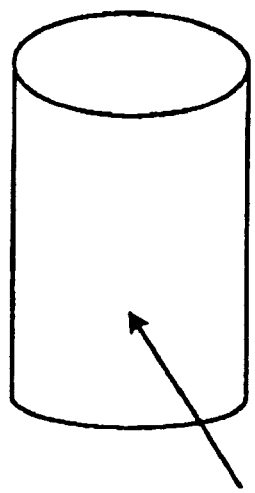
FIG. 7 illustrates exemplary screens to which the present invention can be applied.
Figure 7:
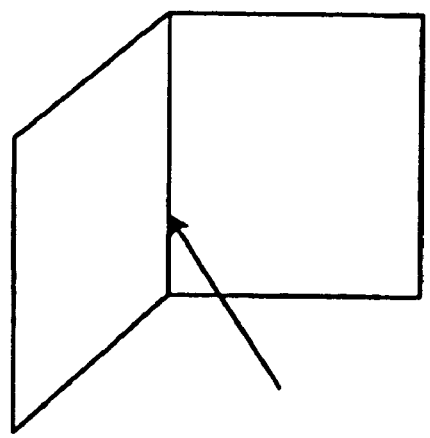
Figure 7:
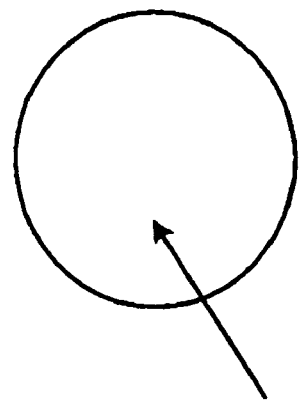
Figure 7:
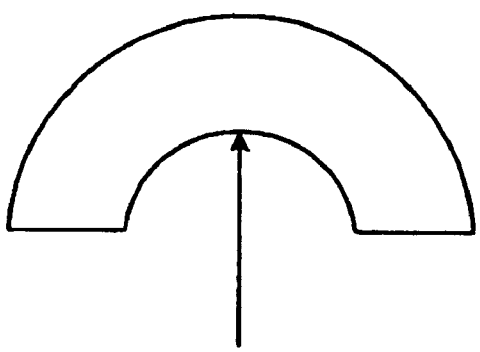

Also, while the foregoing embodiment has employed a cylindrical screen given as an example of projection screen, the system of the present invention can also be applied, for example, to a spherical screen, a screen extending over two walls including a corner between both walls, a concave screen as illustrated in FIG. 7, or a sinusoidally waved screen, a screen extending over two walls including a corner between both walls with the left wall and right wall being in a different proportion, a screen including walls of a rectangular solid including corners between both walls, a wall-shaped screen having corners on the left and right sides, and the like, as illustrated in FIG. 8. In regard to the shape of the screen, the present invention can be directed to a screen in any arbitrary shape for which an approximate equation can be derived for making corrections. Each of the arrows drawn in FIGS. 7 and 8 indicates a direction in which an associated projector projects an image.

With a concave screen, a correction can be made by setting an approximate equation which has characteristics opposite to those of a convex screen. With a screen composed of flat walls with a corner between both walls, a correction can be made using an equation representative of a straight line as an approximate equation. With a sinusoidally waved screen, a correction can be made by setting a trigonometric function as an approximate expression for the horizontal direction of the screen.

Also, input means 5, which functions as a user interface, is not limited to a slide bar, but may be implemented by a more complicated means as long as it can enter numerical values required to transform approximate equations, not limited to a simple input means.

Further, any appropriate image transformation method can be employed as long as it can transform images using approximate equations. The projection and display methods can also be applied to any device as long as they employ the system of the present invention.

Since the system of the present invention approximates a transforming means with equations, a projected image can be corrected for distortion by a simple user interface. Also, since the result of transformation is directly calculated from an approximate equation for delivery to the projector, the system can be implemented with a small memory capacity. Further, since the approximation of the transforming means with equations provides the ability to support any screen as long as approximate equations can be created, the present invention can provide a versatile projector. Moreover, since the system of the present invention can be implemented by relatively simple components without the need for a projector in a complicated shape or advanced technologies, the system can be readily incorporated in consumer products.

What is claimed is:

1. A projector comprising:
   a storage device that stores a predetermined approximate expression for correcting a projected image for distortion;
   a calculator that performs a geometrical transformation for said projected image emitted from said projector, in accordance with said predetermined approximate expression; and
   a receiver to receive a value for substitution as one of a parameter and a variable into said predetermined approximate expression, wherein said value comprises a value entered by a user using an input device.

2. The projector according to claim 1, wherein said value entered by said user comprises a numerical value entered through said input device.

3. The projector according to claim 1, wherein said input device comprises a slide bar through which said user interacts to enter said value.

4. The projector according to claim 3, wherein said slide bar comprises a slide bar located on one of:
   said projector; and
   a graphical user interface (GUI) associated with a display device for said projector.

5. The projector according to claim 1, wherein said input device comprises a graphical user interface (GUI) associated with a display device used for said projector.

6. The projector according to claim 1, wherein said predetermined approximate expression comprises one of an expression representative of:
   a parabola;
   a linear equation; and
   a trigonometric function.

* * * * *